(12) United States Patent
Shi et al.

(10) Patent No.: US 6,587,238 B1
(45) Date of Patent: Jul. 1, 2003

(54) TRANSMITTING AN OPTICAL SIGNAL WITH CORRESPONDING WDM AND TDM CHANNELS

(75) Inventors: Chao-Xiang Shi, Milpitas, CA (US); Li-Ping Chen, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/556,232

(22) Filed: Apr. 24, 2000

(51) Int. Cl.$^7$ .................................................. H04J 4/00
(52) U.S. Cl. ........................ 359/123; 359/161; 359/173; 359/180; 359/181
(58) Field of Search .............................. 359/123, 161, 359/173, 180, 181

(56) References Cited

U.S. PATENT DOCUMENTS

| | | | | |
|---|---|---|---|---|
| 5,166,821 A | * | 11/1992 | Huber | 359/238 |
| 5,227,908 A | * | 7/1993 | Henmi | 359/154 |
| 5,339,183 A | * | 8/1994 | Suzuki | 359/123 |
| 6,256,130 B1 | * | 7/2001 | Bulow | 359/173 |

OTHER PUBLICATIONS

Near Margalit, "Intelligent DWD takes Gigabit Ethernet to the Man," Lightwave, vol. 16 (No. 9), (Jun., 1999).

* cited by examiner

Primary Examiner—Kinfe-Michael Negash
(74) Attorney, Agent, or Firm—Harley R. Ball; Steven J. Funk; Kevin D. Robb

(57) ABSTRACT

An optical signal transmitter is disclosed that transmits an optical signal with corresponding Wavelength Division Multiplexing (WDM) channels and Time Division Multiplexing (TDM) channels. The transmitter is comprised of a laser, a dispersion system, and a modulator. The laser generates and transmits a narrow laser pulse comprised of a plurality of wavelength channels. The dispersion system broadens the narrow laser pulse into a wide laser pulse. The modulator modulates the wide laser pulse based oh an electric modulation signal comprised of a plurality of time slot channels wherein the time slot channels in the electric modulation signal correspond to the wavelength channels in the wide laser pulse respectively. The modulator transfers a modulated wide laser pulse. Channels of the modulated wide laser pulse are hybrid wavelength and time slot channels. The transmitter singularly transmits a WDM optical signal comprised of multiple wavelength channels. The transmitter also allows a filter to drop time slot channels from a TDM optical signal instead of an expensive demultiplexer.

18 Claims, 3 Drawing Sheets

TRANSMITTING AN OPTICAL SIGNAL WITH CORRESPONDING WDM AND TDM CHANNELS

RELATED APPLICATIONS

Not applicable

FEDERALLY SPONSORED RESEARCH OR DEVELOPMENT

Not applicable

MICROFICHE APPENDIX.

Not applicable

BACKGROUND OF THE INVENTION

1. Field of the Invention

The invention relates to the field of optical communication systems, and in particular, a transmitter configured to transmit an optical signal with corresponding Wavelength Division Multiplexing (WDM) and Time Division Multiplexing (TDM) channels.

2. Description of the Prior Art

In a fiber optic system, a transmitter transmits an optical signal over a fiber to a receiver. Designers of fiber optic systems work to increase transfer capacities of the system to accommodate more data traffic and the Internet. Transmitters use Wavelength Division Multiplexing (WDM) and Time Division Multiplexing (TDM) to increase the fiber optic system capacities.

A conventional transmitter is comprised of a laser and a modulator. The laser generates a laser signal and transfers the laser signal to the modulator. The modulator modulates the laser signal to represent data to be transmitted over an optical fiber. The modulator modulates either directly or externally. To directly modulate, the modulator varies an injected current supplied to the laser and changes the intensity of the laser signal. To externally modulate, the modulator receives the laser signal and an electric modulation signal. The electric modulation signal represents the data to be transmitted over the fiber. The modulator changes the amplitude and/or phase of the laser signal based on the electric modulation signal. An example of an external modulator is a Mach-Zehnder interferometer.

Time Division Multiplexing (TDM) transmits a number of signals simultaneously over a communications medium by interleaving sections of the individual data signals one after another. TDM divides a bandwidth of a TDM optical signal into fixed time slots of a fixed capacity, wherein the time slots represent time slot channels. To implement TDM in a fiber optic system, a time division multiplexer receives the individual data signals and assigns a time slot channel to the individual data signals. The time division multiplexer breaks the data signals into sections. The time division multiplexer plugs the sections of the data signals into the time slots of the TDM optical signal corresponding to the time slot channel assigned to the data signals.

In a TDM fiber optic system, nodes in the system are assigned time slot channels. Nodes drop the assigned time slot channels from the TDM optical signal using a demultiplexer, such as a Synchronous Optical NETwork (SONET) Add-Drop Multiplexer (ADM).

A problem with TDM is the fiber optic system uses multiple demultiplexers to drop the time slot channels from the TDM optical signal at the nodes. The separate nodes use separate demultiplexers to drop the time slot channels from the TDM optical signal. The number of demultiplexers depends on the number of nodes in the system. Demultiplexers are relatively expensive and increase the cost of the TDM fiber optic system.

Wavelength Division Multiplexing (WDM) passes multiple data channels over one or more wavelengths of light simultaneously over a single fiber. To implement WDM in a fiber optic system, multiple transmitters transmit optical signals over separate wavelength channels to a multiplexer. The multiplexer combines the optical signals to produce a WDM optical signal comprised of multiple wavelength channels. For example, a first transmitter transmits a first optical signal over a first wavelength channel, a second transmitter transmits a second optical signal over a second wavelength channel, and a third transmitter transmits a third optical signal over a third wavelength channel. A multiplexer receives and multiplexes the first, second, and third optical signals to produce the WDM optical signal comprised of a first wavelength channel, a second wavelength channel, and a third wavelength channel.

In a WDM fiber optic system, nodes in the system are assigned wavelength channels. Nodes drop the assigned wavelength channels from the WDM optical signal using an Optical Add-Drop Multiplexer (O-ADM). One example of the O-ADM is a conventional filter. Nodes also add the wavelength channels back to the WDM optical signal.

A problem with WDM is the fiber optic system uses multiple transmitters to transmit the WDM optical signal. WDM uses separate transmitters for the separate wavelength channels in the WDM optical signal. As the number of wavelength channels in the WDM optical signal increase, the number of transmitters increases raising the cost of the fiber optic system.

SUMMARY OF THE INVENTION

An optical signal transmitter transmits an optical signal with corresponding Wavelength Division Multiplexing (WDM) and Time Division Multiplexing (TDM) channels to solve the above problems. The transmitter is comprised of a laser, a dispersion system, and a modulator. The laser transmits a narrow laser pulse comprised of a plurality of wavelength channels. The dispersion system broadens the narrow laser pulse into a wide laser pulse. The modulator modulates the wide laser pulse based on an electric modulation signal comprised of a plurality of time slot channels wherein the plurality of time slot channels in the electric modulation signal correspond to the plurality of wavelength channels in the wide laser pulse respectively. The channels of the modulated wide laser pulse are hybrid wavelength and time slot channels.

The transmitter advantageously reduces the cost of a fiber optic system. The transmitter can be used at a central node so that multiple channels can share a common laser and modulator. WDM typically requires a separate transmitter for each channel of a WDM optical signal. The transmitter in this embodiment of the invention singularly generates a WDM optical signal with multiple channels. Similarly, TDM typically requires expensive demultiplexers to drop channels at respective nodes in the fiber optic system. With the hybrid wavelength and time slot channels of the invention, nodes in the fiber optic system can drop a TDM channel from a WDM and TDM optical signal with a filter as is commonly done in a WDM system.

In another embodiment of the invention, the transmitter further comprises a control system configured to generate the electric modulation signal. The control system is comprised of a delay system and a multiplexer. The delay system receives a plurality of data signals and delays the data signals individually by a different multiple of a specific time period. The multiplexer receives and multiplexes the delay data signals to generate the electric modulation signal.

DETAILED DESCRIPTION OF THE PREFERRED EMBODIMENT

Figure 1:
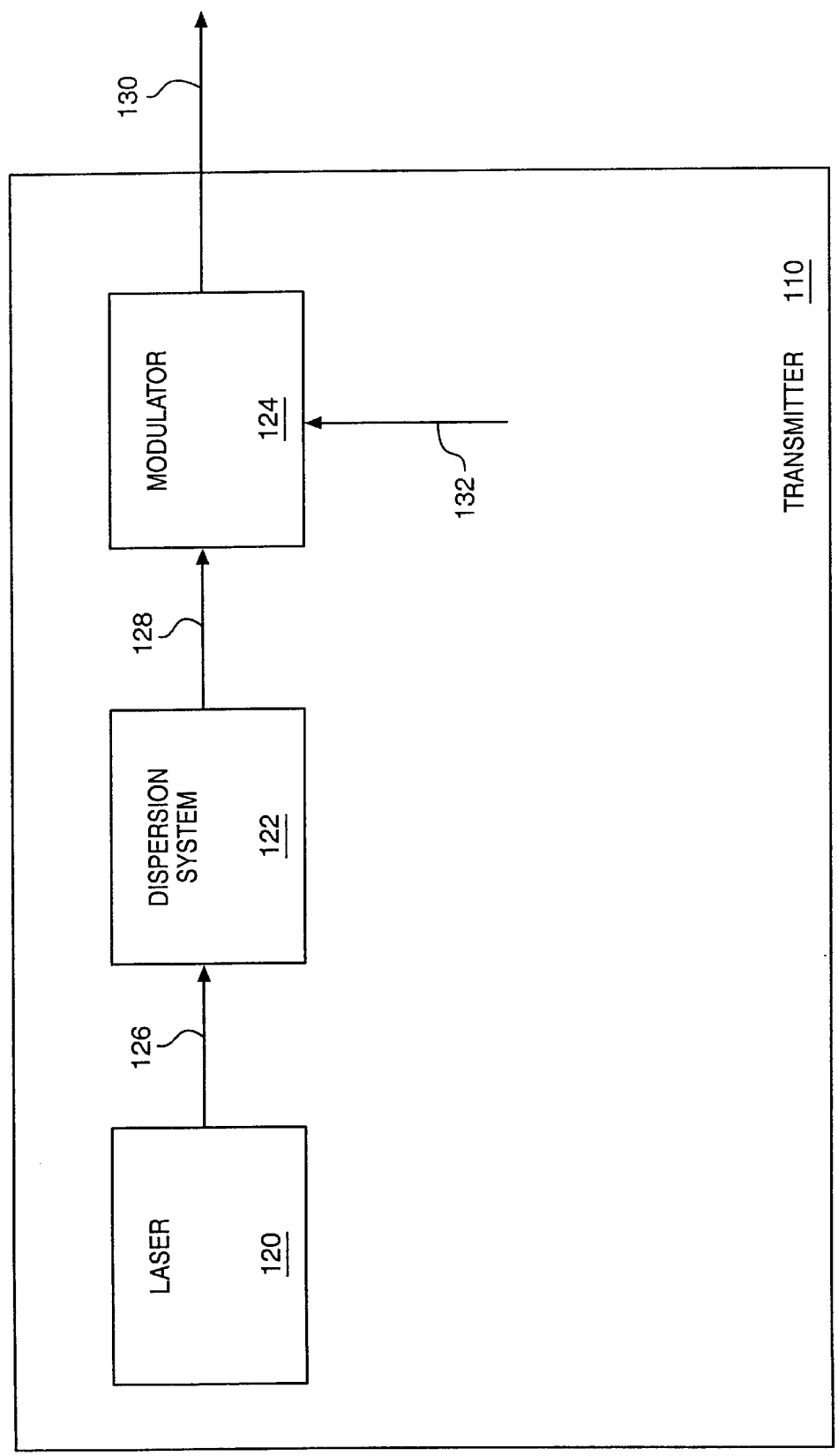
FIG. 1 is a block diagram depicting a transmitter in an example of the invention.
Figure 2:
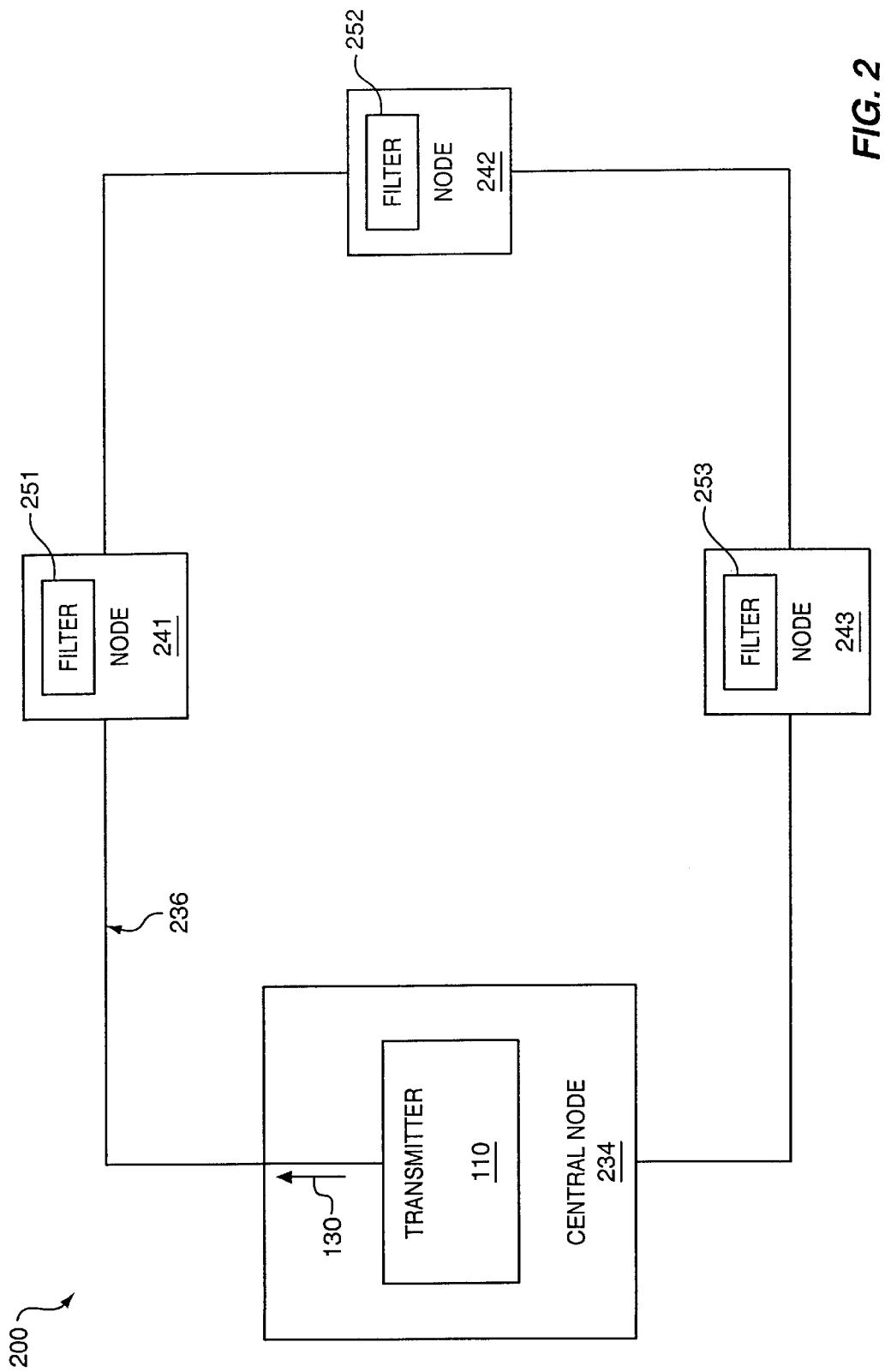
FIG. 2 is a block diagram depicting a fiber optic system in an example of the invention.

Transmitter Operation and Configuration—FIGS. 1–2

FIG. 1 depicts a specific example of a transmitter 110 in accord with the present invention. Transmitter 110 is comprised of a laser 120, a dispersion system 122, and a modulator 124. Laser 120 is coupled to dispersion system 122. Dispersion system 122 is coupled to modulator 124. Laser 120 is configured to generate and transmit a narrow laser pulse 126. Dispersion system 122 is configured to broaden the narrow laser pulse 126 into a wide laser pulse 128. Modulator 124 is configured to receive the wide laser pulse 128 and an electric modulation signal 132, modulate the wide laser pulse 128 based on the electric modulation signal 132, and transfer a modulated wide laser pulse 130.

In operation, laser 120 generates the narrow laser pulse 126 comprised of wavelength channels $\lambda_1, \lambda_2, \ldots, \lambda_n$ and transmits the narrow laser pulse 126 to dispersion system 122. The wavelength channels $\lambda_1, \lambda_2, \ldots, \lambda_n$ are specific wavelength bands typical of WDM. The narrow laser pulse 126 is any laser pulse between approximately 50 fs–100 fs. Dispersion system 122 broadens the narrow laser pulse 126 into the wide laser pulse 128. The wide laser pulse 128 is a laser pulse greater than approximately 100 fs. The wide laser pulse 128 is.comprised substantially of the wavelength channels $\lambda_1, \lambda_2, \ldots, \lambda_n$. Dispersion system 122 transfers the wide laser pulse 128 to modulator 124. Modulator 124 receives the wide laser pulse 128 and the electric modulation signal 132. The electric modulation signal 132 represents data to be transmitted by transmitter 110. The electric modulation signal 132 is comprised of time slot channels 1, 2, ..., n. The time slot channels 1, 2, ..., n are groups of specific time slots typical of TDM. Modulator 124 modulates the wide laser pulse 128 based on the electric modulation signal 132 wherein the wavelength channels $\lambda_1, \lambda_2, \ldots, \lambda_n$ in the wide laser pulse 128 correspond to the time slot channels 1, 2, ..., n in the electric modulation signal 132 respectively. After modulation, channels 1, 2, ..., n of the modulated wide laser pulse 130 are hybrid wavelength and time slot channels. Modulator 124 transfers the modulated wide laser pulse 130 more descriptively referred to as a WDM and TDM optical signal 130.

FIG. 2 shows transmitter 110 implemented in a fiber optic system 200. One example of fiber optic system 200 is as a Metropolitan Area Network (MAN). Fiber optic system 200 is comprised of a central node 234 and nodes 241–243. Central node 234 is comprised of transmitter 110. Nodes 241–243 are comprised of filters 251–253 respectively. Transmitter 110 and nodes 241–243 are coupled in series by a fiber 236. In operation, transmitter 110 transmits the WDM and TDM optical signal 130 over fiber 236. Node 241 receives the WDM and TDM optical signal 130. Filter 251 drops a first channel from the WDM and TDM optical signal 130 by filtering the wavelength channel $\lambda_1$ from the WDM and TDM optical signal 130. The first channel is a hybrid wavelength and time slot channel. By filtering the wavelength channel $\lambda_1$, filter 251 automatically drops the time slot channel 1. Therefore, filter 251 performs TDM demultiplexing in this embodiment. Node 241 filters out the wavelength channel $\lambda_1$ without substantially affecting neighboring channels. Node 241 transfers the WDM and TDM optical signal 130 to node 242.

Node 242 receives the WDM and TDM optical signal 130. Filter 252 drops a second channel from the WDM and TDM optical signal 130 by filtering the wavelength channel $\lambda_2$ from the WDM and TDM optical signal 130. The second channel is a hybrid wavelength and time slot channel. By filtering the wavelength channel $\lambda_2$, node 242 automatically drops the time slot channel 2. Filter 252 filters out the wavelength channel $\lambda_2$ without substantially affecting neighboring channels. Node 242 transfers the WDM and TDM optical signal 130 to node 243. The same operation takes place in node 243. Fiber optic system 200 could alternatively be comprised of n nodes.

Transmitter 110 advantageously transmits the.WDM and TDM optical signal 130 with corresponding WDM and TDM channels. Transmitter 110 can be used at a central node so that multiple channels share a common laser 120 and modulator 124. Transmitter 110 singularly transmits a WDM optical signal with multiple channels instead of multiple transmitters. Transmitter 110 also allows nodes to drop time slot channels from a TDM optical signal with a simple filter instead of an expensive demultiplexer. Transmitter 110 provides for a cheaper fiber optic system 200 for implementing WDM and/or TDM.

Figure 3:
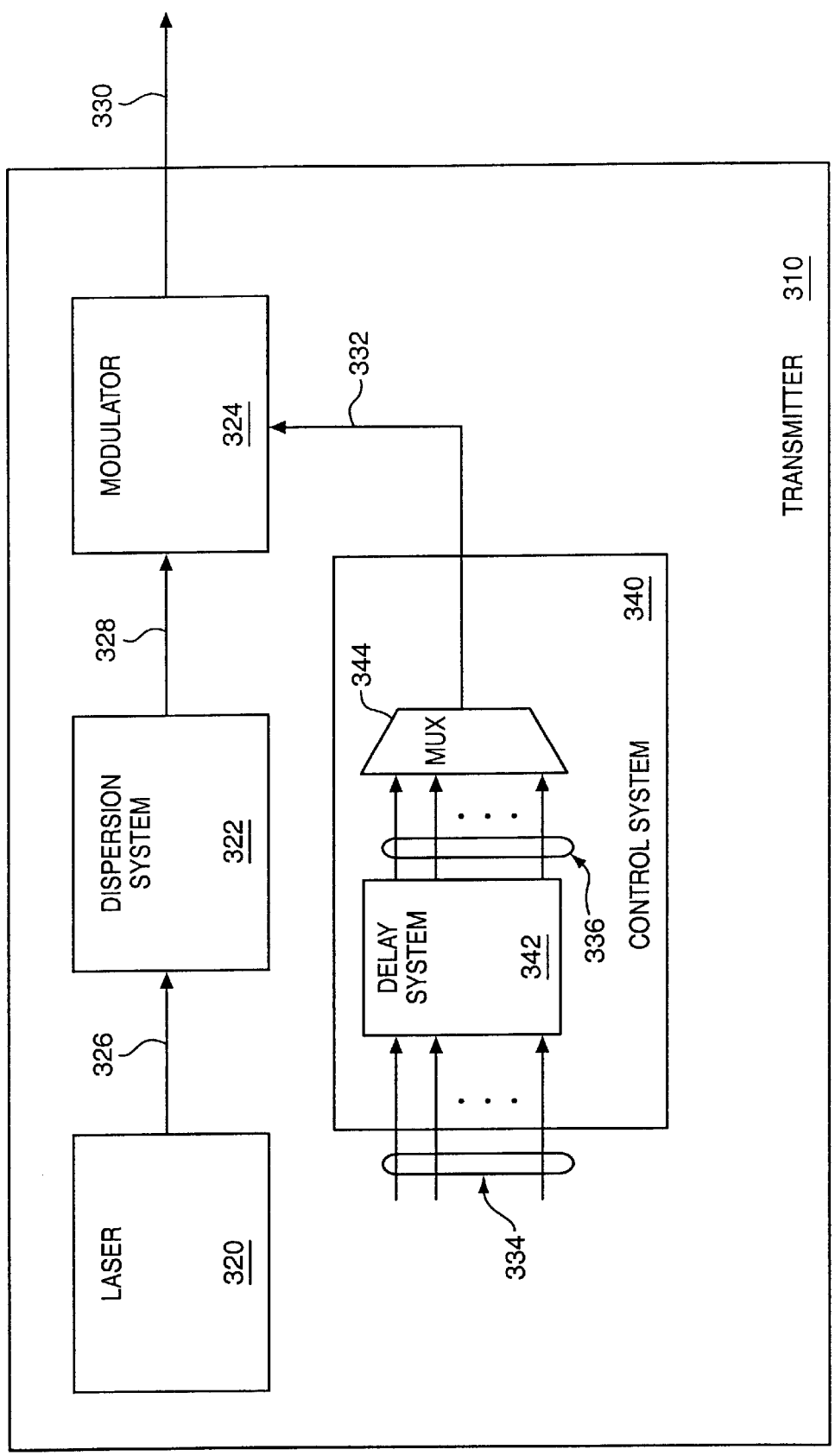
FIG. 3 is a block diagram depicting a transmitter including a control system in an example of the invention.

Transmitter with a Delay System and Multiplexer Configuration and Operation—FIG. 3

FIG. 3 depicts a specific example of a transmitter 310 in accord with the present invention. Those skilled in the art will appreciate numerous variations from this example that do not depart from the scope of the invention. Those skilled in the art will also appreciate that various features could be combined to form multiple variations of the invention.

Transmitter 310 is comprised of a laser 320, a dispersion system 322, a modulator 324, and a control system 340. Control system 340 is comprised of a delay system 342 and a multiplexer 344. Laser 320 is coupled to dispersion system 322. Dispersion system 322 is coupled to modulator 324. Modulator 324 is coupled to multiplexer 344. Multiplexer 344 is coupled to delay system 342.

In operation, laser 320 generates a narrow laser pulse 326 comprised of wavelength channels $\lambda_1, \lambda_2, \ldots, \lambda_n$ and transfers the narrow laser pulse 326 to dispersion system 322. The wavelength channels $\lambda_1, \lambda_2, \ldots, \lambda_n$ are specific wavelength bands typical of WDM. Laser 320 is a Femto second laser with a repetition rate of approximately 150 Mbit/s, but alternatively the repetition rate could vary depending on requirements. The narrow laser pulse 326 is any laser pulse between approximately 50 fs–100 fs. The range of the wavelength channels $\lambda_1, \lambda_2, \ldots, \lambda_n$ is between approximately 30 nm–40 nm. Dispersion system 322 broadens the narrow laser pulse 326 into a wide laser pulse 328. The wide laser pulse 328 can also be referred to as a chirped broad pulse. Dispersion system 322 is a short section of fiber with high dispersion. High dispersion is dispersion greater than normally occurring in a single mode fiber. For example, a high dispersion fiber is a Dispersion Compensation Fiber (DCF) with a dispersion of −80 ps/km-nm. The high dispersion properties of the short section of fiber spreads the narrow laser pulse 326 into the wide laser pulse 328. Dispersion system 322 could generate negative dispersion to have an opposite dispersion effect as a standard transmission fiber. The wide laser pulse 328 is a laser pulse greater than approximately 100 fs. The wide laser pulse 328 is comprised substantially of the wavelength channels $\lambda_1, \lambda_2, \ldots, \lambda_n$. Dispersion system 322 transfers the wide laser pulse 328 to modulator 324.

Concurrently with laser 320, delay system 342 receives n data signals 334 from a plurality of sources (not shown). The data signals 334 are STS-3 signals in a Return-to-Zero (RZ) format. Delay system 342 delays the individual data signals 334 by a different multiple of a specific time period Δ. For instance, delay system 342 delays a first data signal by 1*Δ, a second data signal by 2*Δ, and an nth data signal by n*Δ. Delay system 342 generates Δ-sized time slots by delaying the data signals 334 by multiples of Δ. The time slots represent time slot channels 1, 2, . . . , n. The time slot channels 1, 2, . . . , n are groups of specific time slots typical of TDM. Delay system 342 transfers delayed-data signals 336 to multiplexer 344. Multiplexer 344 multiplexes the delayed data signals 336 to generate an electric modulation signal 332. The electric modulation signal 332 is comprised of the Δ-sized time slots representing the time slot channels 1, 2, . . . , n. The electric modulation signal 332 is a multiplexed STS-3 signal.

Modulator 324 receives the wide laser pulse 328 and the electric modulation signal 332. Modulator 324 is an Electro-Absorption (EA) modulator or a LiNbO3 modulator. Modulator 324 modulates the wide laser signal 328 based on the electric modulation signal 332 wherein the wavelength channels $\lambda_1, \lambda_2, \ldots, \lambda_n$ in the wide laser pulse 328 correspond to the time slot channels 1, 2, . . . , n in the electric modulation signal 332 respectively. More particularly, the time slot channels 1, 2, . . . , n have a central wavelength of $\lambda_1, \lambda_2, \ldots, \lambda_n$ respectively. After modulation, the channels 1, 2, . . . , n of a modulated wide laser pulse 330 are hybrid wavelength and time slot channels. For; instance, modulator 324 modulates the first data signal at the wavelength channel $\lambda_1$ and the time slot channel 1. Modulator 324 modulates the second data signal at the wavelength channel $\lambda_2$ and the time slot channel 2. Modulator 324 modulates the nth data signal at the wavelength channel $\lambda_n$ and the time slot channel n.

Modulator 324 transfers the modulated wide laser pulse 330 more descriptively referred to as a WDM and TDM optical signal 330. The WDM and TDM optical signal 330 is an OC-3 signal. A channel bit rate of the WDM and TDM optical signal 330 should be substantially the same as a repetition rate of laser 320, which is approximately 150 Mbit/s.

With transmitter 310 implemented in a fiber optic system, a node in the fiber optic system that drops the wavelength channel $\lambda_1$ from the WDM and TDM optical signal 330 automatically drops the time slot channel 1 because the time slot channel 1 has a central wavelength of wavelength $\lambda_1$. A filter within the node filters out the wavelength channel $\lambda_1$ without substantially affecting neighboring channels. The filter replaces a relatively expensive demultiplexer to drop the time slot channel 1.

The nodes in the fiber optic system also add channels back to the WDM and TDM optical signal 330. The channel bit rate is not limited to OC-3 and can be either RZ or Non-Return-to-Zero (NRZ) format.

Transmitter 310 advantageously transmits the WDM and TDM optical signal 330 with corresponding WDM and TDM channels. Transmitter 310 can be used at a central node so that multiple channels can share a common laser 320 and modulator 324. Transmitter 310 singularly transmits a WDM optical signal with multiple channels instead of multiple transmitters. Transmitter 310 also allows nodes to drop time slot channels from a TDM optical signal with a simple filter instead of an expensive demultiplexer. Transmitter 310 provides for a cheaper fiber optic system for implementing WDM and/or TDM.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of transmitting an optical signal with corresponding Wavelength Division Multiplexing (WDM) and Time Division Multiplexing (TDM) channels, comprising:

generating a narrow laser pulse comprised of a plurality of wavelength channels;

broadening the narrow laser pulse into a wide laser pulse comprised substantially of the plurality of wavelength channels;

modulating the wide laser pulse based on an electric modulation signal comprised of a plurality of time slot channels wherein the plurality of time slot channels in the electric modulation signal correspond to the plurality of wavelength channels in the wide laser pulse respectively; and transmitting a modulated wide laser pulse.

2. The method in claim 1 further comprising multiplexing a plurality of data signals to produce the electric modulation signal.

3. The method in claim 2 further comprising delaying the data signals individually by a different multiple of a time period.

4. An optical signal transmitter, comprising:

a laser configured to generate and transmit a narrow laser pulse comprised of a plurality of wavelength channels;

a dispersion system coupled to the laser and configured to broaden the narrow laser pulse into a wide laser pulse comprised substantially of the plurality of wavelength channels; and a modulator coupled to the dispersion system and configured to receive the wide laser pulse and an electric modulation signal comprised of a plurality of time slot channels, modulate the wide laser pulse based on the electric modulation signal wherein the plurality of time slot channels in the electric modulation signal correspond to the plurality of wavelength channels in the wide laser pulse respectively, and transfer a modulated wide laser pulse.

5. The optical signal transmitter in claim 4 wherein the laser is a Femto second laser.

6. The optical signal transmitter in claim 4 wherein the dispersion system is comprised of a high dispersion fiber.

7. The optical signal transmitter in claim 4 wherein the modulator is an Electro-Absorption modulator.

8. The optical signal transmitter in claim 4 wherein the modulator is a LiNbO3 modulator.

9. The optical signal transmitter in claim 4 wherein the laser is further configured to transmit at a rate of approximately 150 Mbit/s.

10. The optical signal transmitter in claim 4 wherein the modulated wide laser pulse is an Optical Carrier 3 (OC-3) signal.

11. The optical signal transmitter in claim 4 wherein the laser is further configured to transmit at a rate substantially equal to a channel bit rate of the modulated wide laser pulse.

12. The optical signal transmitter in claim 4 further comprising a multiplexer coupled to the modulator and configured to receive delayed data signals, multiplex the delayed data signals to generate the electric modulation signal, and transfer the electric modulation signal to the modulator.

13. The optical signal transmitter in claim 12 further comprising a delay system coupled to the multiplexer and configured to receive a plurality of data signals, delay the data signals individually by a different multiple of a time period, and transfer the delayed data signals to the multiplexer.

14. The optical signal transmitter in claim 13 wherein the plurality of data signals are Synchronous Transport Signals (STS-3).

15. The optical signal transmitter in claim 13 wherein the plurality of data signals are in Return-to-Zero (RZ) format.

16. An optical communication network, comprising:

an optical fiber;

an optical signal transmitter coupled to the optical fiber and configured to generate a narrow laser pulse comprised of a plurality of wavelength channels, broaden the narrow laser pulse into a wide laser pulse comprised substantially of the plurality of wavelength channels, modulate the wide laser pulse based on an electric modulation signal comprised of a plurality of time slot channels wherein the plurality of time slot channels in the electric modulation signal correspond to the plurality of wavelength channels in the wide laser pulse, and transfer a modulated wide laser pulse over the optical fiber; and a node coupled to the optical fiber and configured to receive the modulated wide laser pulse over the optical fiber and filter a first channel from the modulated wide laser pulse wherein the first channel represents a wavelength channel and a time slot channel.

17. The optical communication system in claim 16 further comprising a plurality of nodes coupled to the optical fiber and configured to receive the modulated wide laser pulse over the optical fiber and filter a plurality of channels from the modulated wide laser pulse wherein the plurality of channels represent both wavelength channels and time slot channels.

18. The optical communication system in claim 16 wherein the node is further configured to add the first channel back to the modulated wide laser pulse.

* * * * *